Nov. 4, 1952     T. J. SKAILES ET AL     2,616,489
UNDERWATER CUTTING TORCH
Filed Feb. 3, 1945     2 SHEETS—SHEET 1
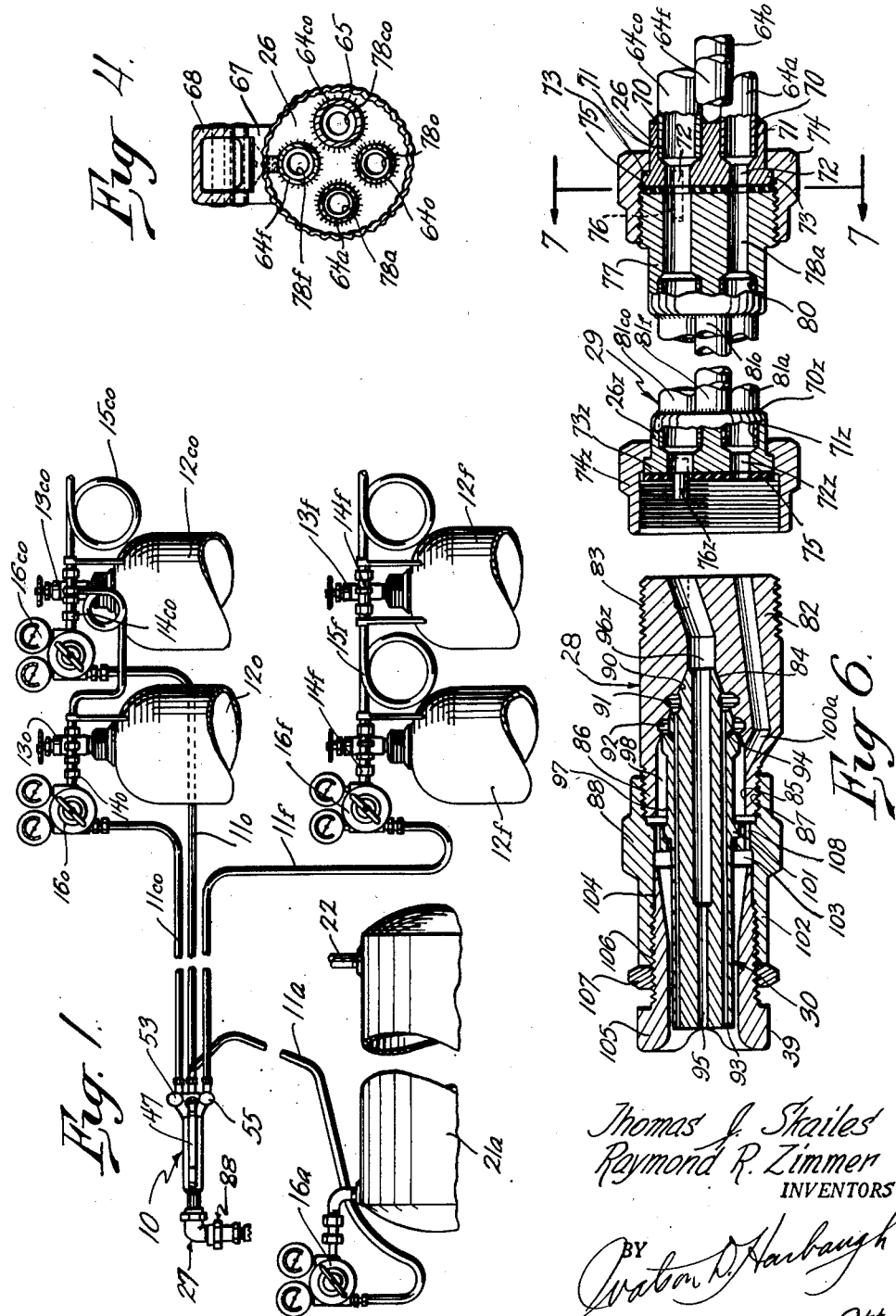
Thomas J. Skailes
Raymond R. Zimmer
INVENTORS
BY
Atty.

Nov. 4, 1952     T. J. SKAILES ET AL     2,616,489
UNDERWATER CUTTING TORCH
Filed Feb. 3, 1945     2 SHEETS—SHEET 2
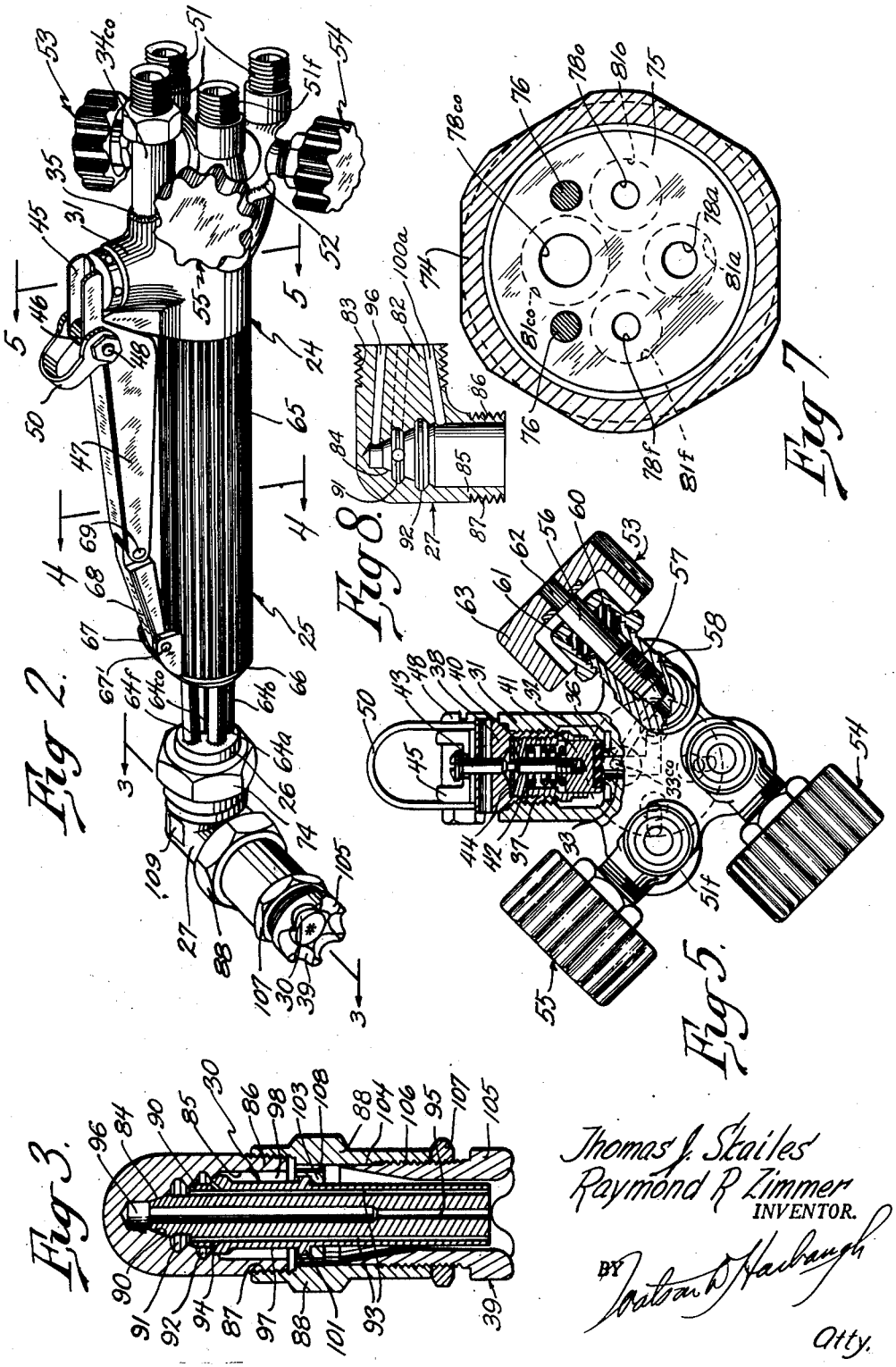

Patented Nov. 4, 1952

2,616,489

UNITED STATES PATENT OFFICE 2,616,489

UNDERWATER CUTTING TORCH

Thomas J. Skailes, Baraboo, Wis., and Raymond R. Zimmer, Chicago, Ill., assignors to The Bastian-Blessing Company, Chicago, Ill., a corporation of Illinois Application February 3, 1945, Serial No. 576,052

7 Claims. (Cl. 158—27.4)

The present invention relates to cutting torches and more particularly to new and useful improvements in underwater cutting torches.

One of the objects of the present invention is to provide a torch arrangement in which the head is interchangeable with any one of a plurality of types of heads or extensions, so arranged that interchangeability above and below water can be readily had without necessarily changing the gas adjustments upon the torch.

A further object of the invention is to provide a torch construction and arrangement in which the torch can be readily raised and lowered along a guide line tied to the work piece at one end and to the attending barge at the other end by a spring winch so that the torch can be raised and lowered rapidly without danger of burning the diver or buckling the hoses. Sending the torch down later leaves the diver unhampered to examine the work.

A further object of the invention is to provide an improved underwater cutting torch whose head is readily interchangeable with any one of a number of other types of heads and extensions effectively without varying the relative tip position of the heads and the gas controls upon the torch.

A further object of the invention is to provide an improved torch which is so contoured that it will not catch in obstacles while being raised and lowered and will not become locked against operation by slag swirling out from the cut.

A further object of the invention is to provide an underwater cutting torch which is readily understood by a diver and can be handled by the diver in accordance with his regular working habits as derived from long experience including ready and convenient operation of the controls, the naturalness of the torch to work with, its long cutting oxygen control, and its freedom from tip fouling with slag.

These being among the objects of the invention, other and further objects will appear from the drawings, the description relating thereto and the appended claims.

Referring to the drawings:

Fig. 1 is a perspective of the invention showing the preferred form of the torch as connected ready for use.

Fig. 2 is an enlarged perspective of the torch itself shown in Fig. 1 as it appears when it is disconnected from the gas supply hoses shown in Fig. 1.

Fig. 3 is an enlarged medial section taken longitudinally through the head, tip and hood taken on line 3—3 of Fig. 2.

Fig. 4 is an enlarged section taken upon the line 4—4 in Fig. 2.

Fig. 5 is an enlarged section taken upon the line 5—5 in Fig. 2.

Fig. 6 is an exploded longitudinal section of an adapter head by which the tip can be operated in alignment with the handle including a removable extension for reaching remote elements to be cut.

Fig. 7 is a section taken upon the line 7—7 in Fig. 6.

Fig. 8 is a section of the head shown in Fig. 2.

Referring now to the drawings in further detail.

The underwater cutting torch is indicated generally by the numeral 10. As illustrated in Fig. 1 the torch is connected to an arrangement of supply tanks in the preferred manner which is similar to that disclosed in the Windsor application Serial No. 376,664, Patent No. 2,396,546, granted March 12, 1946, reference to which is hereby made for a more complete understanding of the invention.

GAS SUPPLY

In the present invention the gases required by the underwater cutting torch are supplied to the torch through four hoses, the hoses being indicated generally by the numeral 11 as followed by suffixes "a" for air, "f" for fuel, "o" for preheat oxygen, and "co" for cutting oxygen to identify the respective hoses. For a better understanding of the invention these suffixes will be used throughout the drawing wherever like parts relate to more than one of the supply lines, beginning with the source of supply and continuing through to the tip.

The hydrogen or acetylene supply for the preheat flame is supplied from a bank of cylinders 12f which have their shut-off valves 13f connected to manifold blocks 14f. The manifold blocks in turn are connected together by pigtails 15f to form a gang.

The two cylinders 12f shown in Fig. 1 are representative of a gang of cylinders numbering as many as desired connected together in the manner described and arranged in any suitable manner for the convenience in connecting the pigtails 15f to the manifolds. The number of cylinders used is selected in relationship to the convenience and the requirements of any particular work project generally expected to be accomplished within a day's time.

The block 14f upon the end cylinder 12f of the bank receives in supported relationship a pressure reducing regulator 16f which in some instances may be a single stage regulator but preferably is of the two stage type such as shown in the Buttner Patent No. 2,362,352 issued November 7, 1944, which supplies the fuel to the torch 10 at an adjustable predetermined pressure through the hose 11f.

Oxygen is supplied for operation of the torch from a bank of oxygen cylinders 12o and 12co therefor connected together in a manner similar to fuel cylinders 12f. In the present invention the bank of oxygen cylinders is divided into two supply lines. One supply line 11o supplying the oxygen for the preheat flame and the other supply line 11co supplying the cutting oxygen to the torch. With this arrangement the use of the cutting oxygen does not bleed the supply of oxygen for the fuel mixture as is the case with conventional torches converted from dry land torch for underwater operation. Furthermore the use of two small hoses for this purpose is less unwieldy than one hose large enough to carry all the oxygen that is necessary for both the cutting and preheat.

The shielding gas that provides an envelope in which the preheat flame and cutting oxygen will pass into contact with the work is generally air or some other fluid suitable for the purpose. This air is supplied from a storage tank 21a through the regulator 16a which is connected to the torch by a hose 11a. A supply of air available in the tank 21a may be replenished from time to time through the conduit 22 connected to a suitable compressor (not shown).

TORCH CONSTRUCTION

The torch as supplied to the diver for use comprises a body 24, a handle 25, a union flange 26 and an L-shaped adapter 27, a straight adapter 28 (Fig. 6) an extension 29 and a shield 39 for replaceable tips 30.

Torch body

The body 24 is preferably a forging having a boss 31 within which to receive a diaphragm valve 32 more particularly shown in Fig. 5. The boss is drilled as at 33co to provide an inlet passageway for cutting oxygen which passageway is adapted to be connected to the cutting oxygen hose by an adapter 34co silver soldered to the body as at 35. The boss 31 is bored to provide a valve seat 36 and threaded as at 37 to receive a gland nut 38. The gland nut 38 is internally threaded to receive a valve guide member 40 which supports the valve member 41 in cooperative position with the seat 36 as urged into closed position therewith by a compression spring 42.

A valve stem 43 is threaded to the valve member 41 and has a reduced portion which passes through a diaphragm 44 in sealed relationship so that the valve member 41 can be freely raised and lowered to open and close the valve. The diaphragm 44 is held in sealed relationship between cooperating shoulders upon the gland member 38 and the guide member 40. Actuation of the valve stem 43 is had by a yoke member 45 pivotally mounted upon a boss 46 disposed at one side of the boss 31. The yoke member 45 is an integral part of a handle or lever 47 which is held in place by a pin 48 which also supports a lowering ring 50 swiveled on the pin for movement out of the way when detached from a lowering or guide line. The compression spring 42 normally holds the valve member 41 in the lowered position as shown in Fig. 5. When the handle 47 is pressed downwardly toward the torch handle 25 the integral yoke member 45 pivots upwardly raising the valve stem 43 to compress the spring 42 and lift the valve member 41 away from the seat 36. When the pressure on the handle 47 is relaxed the spring 42 again moves the valve member 41 downwardly and returns the handle 47 to the position shown in Fig. 2.

Three other passageways are drilled through the body 24 to receive needle valve assemblies threaded at one end, as at 51, for attachment to the respective hoses, and silver soldered at the other end to the body as at 52. The needle valve indicated at 53 is a preheat oxygen adjustment valve; the needle valve indicated at 54 is the shielding air control valve, while the needle valve indicated at 55 is the preheat fuel control valve and the threading 51f is a left hand thread. All three of these valves have valve stems (Fig. 5) threaded as at 57 into the valve body 58 with a packing 60 disposed near the outer end as held in place by a gland nut 61 in sealed relationship against the stem 56. The stems are knurled as at 62 to receive handles 63. The handles are comparatively large and heavily fluted for convenient use by the heavily gloved hands of the diver. The valves are so disposed that the inlet pressure is effective against the valve when closed and not against the packing.

It will be observed that the cutting oxygen handle or lever 47 is located where it will be below the torch when the torch is held by a right handed diver in front of him with the cutting tip directed forwardly ready for use. Thus the handle 47 is readily available for operation by the fingers of the diver manipulating the torch. When the torch is held in this position, the preheat fuel and preheat oxygen adjustments are readily available to the left hand below the arm of the diver holding the torch and the shielding air adjustment extends upwardly and away from the diver where it is convenient for access whenever adjustment of the shielding air is required. The valves are thus arranged so that there is little interference between the forearm of the diver and the valves.

HANDLE CONSTRUCTION

At the forward end of the body 24 four stainless steel tubes 64, each of which are designated with the suffixes "a," "f," "o," or "co" to indicate their use, are silver soldered into place at the oulet of the gas passages provided in the body 24. A fluted sleeve 65 which serves as a handle is slipped over the tubes as supported at one end upon the body 24 and at the other end upon a collar 66 secured to the tubes in any suitable manner. The collar 66 also supports the tubes in spaced relationship. The collar 66 has a streamlined bifurcated boss 67 thereon with a link or lever 68 pivoted thereto at one end and pivoted to the end of the handle or lever 47 at the other end. A lost motion arrangement is provided at one of the pivots 67' and 69, preferably the latter pivot 69, and the lost motion thus provided enables the handle 47 to be operated easily with finger pressure on either the link or handle. The link or lever 68 also serves to prevent anything catching under the handle while the torch is being raised and lowered. The lost motion arrangement is necessary to permit the handle 47 and the link 68 to pivot downwardly together, for the two ends of these elements are pivoted at fixed points, and rotation would be impossible were lost motion not provided at one of the three pivot points.

At their outer ends the tubes 64 are received in the union flange 26 in enlarged mouths 71 of passages 72 therethrough where the tubes are silver soldered in place as at 70. A radial flange 73 upon the union flange supports a union nut 74 that cooperates therewith to receive and make up with any one of a number of fittings which will be shortly described, having reference to Fig. 3 and Fig. 6. A sealing element or gasket 75 is received against the outer face of the union flange 26 as made preferably of neoprene, and pins 76 (Fig. 7) are doweled into the body of the union flange 26 to determine the exact make-up with interchangeable fittings in only one way.

INTERCHANGEABLE FITTINGS

Extension

The extension 29 may be of any one of a number of different lengths such as 6, 10 or 14 inches so that the torch tip 30, whether it be angled with respect to the handle of the torch or in alignment therewith, can be used to reach remote cutting areas. Greater lengths can be made up by several extensions used in tandem.

For this purpose the extension has an externally threaded flange 77. Passages 78, each of which are designated with the suffixes "a," "f," "o" or "co" to indicate their use, are provided therethrough corresponding in size and pattern to the passages through the union flange 26 and mating openings are provided to receive the pins 76 to determine correct alignment. Threaded engagement between the union nut 74 and the extension flange 77 is employed to maintain alignment and to draw the flanges into sealed relationship with the gasket 75 between them so that gases in the tubes 64 will be conducted through the extension flange 77 without mixture or leakage.

At their forward ends the passages 78 in the flange 77 have enlarged outlets as indicated at 80 to receive tubes 81 each of which are designated with the suffixes "a," "f," "o" or "co" to indicate their use, similar in size to the tubes 64 but of equal predetermined lengths and receivable into a second union flange 26z whose assembly and associated parts are identical with those of the first described flange 26 as indicated by the suffix "z" upon the reference numerals.

Heads

Interchangeably mountable upon either the union flange 26z or the union flange 26 are any one of a number of tip carrying heads such as the straight adaptor head arrangement 28 or an angle adaptor head 27. Both of these heads have a base 82 threaded as at 83 to make up in sealed relationship with either of the union flanges 26 or 26z in a manner similar to that in which the flange 77 makes up with the union flange 26 in sealed relationship. Thus the passages in the respective heads are in communication with the proper hose connectors 51 through the tubes 81 and 64. Except for the slight differences in the angles of the heads, the heads 27 and 28 are identical, and identical numerals have been used in Figs. 3, 6, and 8 of the drawings for identical parts and elements.

At the front ends of both the straight head and angle head, the heads are provided with a conical cavity 84 therein, the axis of which determines the rated angle of the head as by the angle it provides between the tips axis and the axis of the handle 25. At its outer end the conical cavity terminates in a cylindrical wall 85 provided in a boss 86 which is threaded upon the outer surface thereof as at 87 to receive a tip nut 88.

As already mentioned the cutting tip is indicated at 30. The tips shown in the heads are alike, each being provided with a conical end 90 mating with the conical cavity 84. Longitudinally spaced mating grooves 91 and 92 are formed in both the head and the tip to receive preheat fuel and preheat oxygen supplied through the hoses 11f and 11o. The grooves thus provide sealed compartments separated from each other and from the atmosphere by mating portions of the conical surfaces when the tip 30 is tightened into place. To avoid flash backs the mixture of these two gases takes place in the tip wherein a longitudinal passageway 93 is drilled longitudinally through the tip to open into the groove 91 and an oblique passage 94 intersecting the passage 93 conducts gas from the groove 92 into communication with the passage 93 so that the streams of preheat oxygen and preheat fuel flow together at the intersection and pass from the front end of the tip for burning in a mixed condition. It is preferred to conduct the fuel through the passage 93 and the oxygen through the passage 94.

The cutting orifice in the tip is a conventional step-drilled or swaged passageway 95 of reduced diameter at its mouth disposed at the axial center of the tip and terminating at the base of the tip in communication with a chamber 96 which is supplied with cutting oxygen through its corresponding set of the tubes 81co and 64co from the cutting oxygen hose 11co as controlled by the lever actuated valve 32.

Forward of the last conical seat the diameter of the tip is reduced as at 97 and/or the wall 85 enlarged sufficiently to provide a cylindrical compartment 98 which is supplied with a shielding air through the passage 100a in the body 29 from the appropriate tubes 81a and 64a.

Beyond the cylindrical wall 85 the tip is shouldered as at 101, and a tip nut 88 is telescoped over the front end of the tip to thread upon the head. The tip nut is provided with an internal radial flange 103 recessed to receive the shoulder 101 of the tip and hold the tip in place and in alignment with the head 28 when the tip nut 88 is threaded tightly into place upon the head 27 or 28.

Beyond the flange 103 the tip nut 88 is enlarged to provide a cylindrical surface 104 which serves as a guide surface for a hood member 105 which in turn is provided with a corresponding mating surface and threaded with respect to the tip nut as at 106 so that the hood 105 may be adjusted axially of the tip as locked in place by a locknut 107 depending upon the length of the tip, its state of repair and operating conditions experienced. The hood 105 is castellated at its end with castellations having rounded and smooth contours to permit the stream of shielding air to escape laterally after forming a hood without interfering with or causing appreciable back pressure upon the preheat flames and the cutting oxygen stream. The rounding of the castellations and corners to smooth contours eliminate angular corners which become exceptionally hot and burn away irregularly in conventional torches and the useful life of the hood is thereby extended.

The inner contour of the hood 105 and the outer surface of the tip is such that an accelerating action is provided for air leaving the space 98 and discharged within the hood 105 beyond the end of the tip, a plurality of passages 108 being provided in the flange 103 for the passage of the air forwardly from the head and outwardly along the outer surface of the tip.

With this construction the air supply passes along the surface of the tip and creates a relatively low pressure bell in front of the tip which not only shields but augments the flow and action of the preheat flames at any depth to which the torch is adjusted by the needle valve 54.

The outer and end surfaces of the tip and the inner surface and castellations of the hood are chrome plates bright to reduce to a minimum the surface friction imposed by these walls upon the air passing between them.

Having thus described the invention it will be seen how with one main body and one set of controls, an underwater cutting torch can be provided which is readily adaptable to take care of all cutting conditions encountered under water. Furthermore it will be appreciated that a torch which is set for proper working conditions at a given depth can be raised to the surface, gas valves closed some place in the line other than the adjustment needle valve shut off by the attendant, and the head readily removed by loosening the union nut 74. An extension 29 of any given length requested by the diver can then be inserted and either the same head or another installed quickly. The torch can be immediately relit, fastened upon the guide line by the ring 50 and lowered to the diver for him to continue cutting without changing the gas adjustments.

It has already been mentioned that the relative position of the handle 47 and the tip 30 is arranged for the convenience of the diver. This relationship is maintained by the pin 76 arrangement whenever an angle head is used upon the torch with or without an extension 27 so that the habits of the diver in using the torch with heads of different angles at different lengths from the handle is not fundamentally changed.

In operation the diver descends to his working station taking with him the end of a small lead wire which he fastens to some point convenient to him upon a work piece either by hook or by looping the wire around a projection. After examining his work he tells his attendant by phone what torch head he desires upon the torch. This is immediately placed upon the torch, and preferably the torch lighted above the surface. The pressures are set at the two stage regulators for optimum results at the depth indicated. A slip ring is slidably mounted upon the lead wire with a snap clasp for fastening to the lowering ring 50. Thereafter the torch is lowered rapidly to the diver to a point where he can take hold of it without danger of burning a hole in his suit. Such might be a fatal accident.

After the diver has made further adjustments upon the torch to suit the immediate conditions he encounters he places the hood 105 against the work piece and the air bell forces the water through the castellations away from the preheat flames. The flames engage the metal and after the metal is heated to its ignition point the diver turns on the cutting oxygen by depressing the handle 47. The cut is commenced and carried along by moving the torch gradually along the surface of the metal.

Because of poor visibility, the cut is very often lost or several false starts are encountered but the diver persists until the cut reaches a point where with the torch as thus arranged is no longer effective. Upon analyzing the requirements to continue the cut the diver asks that the torch be taken up and a different head, either a head of a different angle or a straight head be placed on it with or without an extension 29. The conversion is rapidly made by the attendant and the torch again lighted and lowered without the diver's adjustments being molested. The torch is again taken by the diver and the work proceeds until the cutting conditions again change requiring another conversion of the torch.

In conventional practices the diver prefers to worry along under varying cutting conditions with the torch he has at hand rather than run the risk of having a good adjustment upon the torch changed. A great deal of delay is thus incurred where the diver repeatedly tries to make the cut under conditions for which the torch is not adapted as compared with the time that can be saved by the diver being able to have the torch converted quickly to take care of new conditions in one or two minutes, even at great depths.

Not only this but in those instances where the diver wishes to change the tip himself on the job, he can put an angle tip on the torch before he goes down and take down with him a straight head with the tip already in it. Then when he encounters a problem which requires the use of the other tip he can turn off the gas supply, or have it turned off, and use two wrenches, one engaging a wrenching surface such as indicated at 109 upon the head and the other for the union nut 74. Once he has loosened the union nut with the wrench it will unthread rapidly by hand and the heads can be changed with the replacement head tightened in place enough to compress the gasket 75 again to reestablish a good seal. Thereafter the diver can turn on the gases and relight the torch with an electric or a gas lighter generally provided for that purpose. The work proceeds without interruption other than the few seconds time required to change the head.

Whenever the diver wishes to replace the straight head with an angled head this can be accomplished very easily since the pins 76 assist him in locating the head properly in place upon the torch. Furthermore the resiliency in the gasket tends to maintain a tightness of the nut against loosening. There is no relative movement between the head and the torch to induce a loosening once they are tightened in place.

Beyond a certain depth the diver enters a zone of darkness which even a powerful searchlight cannot break more than a few feet. Furthermore, more often than not the searchlight is not exactly where the diver may want it when he wishes to change the tip, particularly if he is cutting away from an earlier location of the searchlight. The change of heads can be accomplished by him in the dark, the gasket being held in place also by the pins so it is not lost when the change is made.

Having thus described the invention, it will be appreciated from the construction and operation of the invention how the objects are attained and how a substantial saving in cutting time can be made as compared with conventional practices.

Consequently, although the invention has been described in connection with several embodiments, it will be readily apparent to those skilled in the art that various and further uses and relationships can be provided without departing from the spirit of the invention the scope of which is commensurate with the appended claims.

What is claimed is:

1. A torch including a plurality of conduits, a handle on said conduits, means for connecting said conduits to separate sources of gases, means for controlling the flow of gas through one of the conduits including a valve and a valve operating lever assembly disposed to one side of the handle where an operator's hand holding the handle can control the valve operating lever assembly, said assembly including a plurality of levers pivoted at spaced points with respect to the handle and pivoted at their proximate ends with respect to each other, and means at one of the pivot points permitting the corresponding lever to move longitudinally a short distance with respect to the pivot point as the plurality of levers are moved toward the handle.

2. An article of manufacture for use with a cutting torch having a plurality of separate gas passages terminating at one end in an element having a flat side defining a plane, and a head for supporting a tip comprising a body adapted at one end to mate in complementary relationship with said flat side in a single position in readily disengageable relationship, said body at the other end having a conical socket therein for receiving a tip in supported sealed relation, said head being adapted to receive a tip nut for holding the tip in place, and a hood supported by said tip nut for enclosing said tip, said hood and said tip defining an annular passage.

3. A torch including a plurality of conduits, a handle on said conduits, means for connecting said conduits to separate sources of gases, means for controlling the flow of gas through one of the conduits including a valve and a valve operating lever assembly comprising a pair of levers pivoted at spaced points and disposed to one side of the handle where an operator's hand holding the handle can control the valve operating lever assembly, at least one of said levers being loosely pivoted to provide lost motion, said levers and the axis of the handle defining a plane, a head for supporting a tip and hood, means for detachably supporting the head upon the end of said conduits including a union nut, and means for holding the head in only one fixed relative position with respect to the valve operating lever assembly, said head supporting a tip at a predetermined angle to said plane.

4. A torch including a plurality of conduits, a cylindrical handle on said conduits, means for connecting said conduits to separate sources of gases, means for controlling the flow of gas through one of the conduits including a valve and a valve operating lever assembly disposed to one side of the cylindrical handle and loosely pivoted at two spaced points thereon where an operator's hand holding the cylindrical handle can control the valve operating lever assembly, and means for detachably supporting a tip supporting head upon the end of said conduits in sealed relation including a union nut, said tip being supported at a predetermined angle to the plane defined by the handle and the lever assembly.

5. In an underwater torch the combination including a flat sided member having a plurality of conduits terminating in the flat side, a tip receiving head adapted to fit snugly against said flat side and releasable means for holding the head in such position, a tip receiving opening in said head, passageways in said head connecting the conduits in the flat side with the tip receiving opening, a coupling nut threadably attached to said head and surrounding said tip receiving opening, a tip held in said opening by said coupling nut, and an air hood received by said coupling nut and enclosing said tip, said hood having an internal surface spaced from said tip to define an annular air passage and said tip having a cylindrical surface.

6. A torch including a plurality of conduits, a handle on said conduits, means for connecting said conduits to separate sources of gases, means for controlling the flow of gas through one of the conduits including a valve and a valve operating lever disposed to one side of the handle where an operator's hand holding the handle can control the valve operating lever, a head for supporting a tip and hood, means for detachably supporting the head on the end of said conduits, and means for holding the head in only one fixed relative position with respect to said valve operating lever, said head supporting a tip whose long axis lies substantially in a plane perpendicular to the axis of said handle, and the lever and the handle lying in a plane substantially perpendicular to the axis of the tip.

7. In a torch the combination including a handle, a conduit for gas extending through said handle, and means for controlling the flow of gas through said conduit including a valve and a valve operating lever assembly disposed to one side of said handle where an operator's hand holding the handle can control the lever assembly, said assembly comprising a pair of levers pivoted at their ends at spaced points with respect to said handle and pivotally connected together at their proximate ends, and means at one of the pivot points permitting one of said levers to move longitudinally a short distance with respect to the pivot point to allow the assembly to be moved with respect to the handle.

THOMAS J. SKAILES.
RAYMOND R. ZIMMER.

REFERENCES CITED

The following references are of record in the file of this patent:

UNITED STATES PATENTS

| Number | Name | Date |
|---|---|---|
| Re. 22,610 | Barna | Mar. 6, 1945 |
| 1,060,393 | Wright | Apr. 29, 1913 |
| 1,222,319 | Mueller | Apr. 10, 1917 |
| 1,276,893 | Fischer | Aug. 27, 1918 |
| 1,409,333 | Wass, et al. | Mar. 14, 1922 |
| 1,721,569 | McCutcheon | July 23, 1929 |
| 1,771,511 | Quelch | July 29, 1930 |
| 1,828,135 | Fausek, et al. | Oct. 20, 1931 |
| 1,865,905 | Hammon | July 5, 1932 |
| 1,926,438 | Fausek, et al. | Sept. 12, 1933 |
| 1,940,343 | Bennett, et al. | Dec. 19, 1933 |
| 2,092,579 | Kehl | Sept. 7, 1937 |
| 2,148,797 | Barna | Feb. 28, 1939 |
| 2,188,069 | Walsh | Jan. 23, 1940 |
| 2,204,756 | Hasse, et al. | June 18, 1940 |
| 2,213,748 | Stettner | Sept. 3, 1940 |
| 2,224,171 | Van Triest | Dec. 10, 1940 |
| 2,294,392 | Egger, et al. | Sept. 1, 1942 |
| 2,376,413 | Babcock | May 22, 1945 |
| 2,396,546 | Windsor | Mar. 12, 1946 |